United States Patent [19]

Jardine

[11] Patent Number: 5,619,647
[45] Date of Patent: Apr. 8, 1997

[54] SYSTEM FOR MULTIPLEXING PRIORITIZED VIRTUAL CHANNELS ONTO PHYSICAL CHANNELS WHERE HIGHER PRIORITY VIRTUAL WILL PRE-EMPT A LOWER PRIORITY VIRTUAL OR A LOWER PRIORITY WILL WAIT

[75] Inventor: Robert L. Jardine, Cupertino, Calif.

[73] Assignee: Tandem Computers, Incorporated, Cupertino, Calif.

[21] Appl. No.: 316,402

[22] Filed: Sep. 30, 1994

[51] Int. Cl.⁶ .................................................. G06F 7/00
[52] U.S. Cl. .......................... 395/200.01; 395/200.03; 395/200.12; 369/229; 369/238.3; 369/232.9; 369/241.2; 369/242.94; 369/284.4; 370/412; 370/462; 340/825.5
[58] Field of Search ........................ 395/200.2, 200.12, 395/650, 200.01, 200.03; 370/77, 85.6, 60; 364/238, 229, 238.3, 232.9, 241.2, 242.94, 284.4

[56] References Cited

U.S. PATENT DOCUMENTS

| | | | |
|---|---|---|---|
| 3,421,150 | 1/1969 | Quosig et al. | 395/650 |
| 3,587,060 | 6/1971 | Quinn et al. | 395/311 |
| 3,825,902 | 7/1974 | Brown et al. | 395/737 |
| 3,985,962 | 10/1976 | Jones et al. | 370/85.6 |
| 4,001,784 | 1/1977 | Bardotti | 395/862 |
| 4,340,776 | 7/1982 | Ganz et al. | 178/3 |
| 4,744,077 | 5/1988 | Fadem et al. | 370/85.8 |
| 4,771,418 | 9/1988 | Narasimhan et al. | 370/58.1 |
| 4,819,229 | 4/1989 | Pritty et al. | 370/85.5 |
| 4,866,703 | 9/1989 | Black et al. | 370/60 |
| 4,991,169 | 2/1991 | Davis et al. | 370/77 |
| 5,115,430 | 5/1992 | Hahne et al. | 370/85.6 |
| 5,132,966 | 7/1992 | Hayano et al. | 370/79 |
| 5,184,348 | 2/1993 | Abdelmouttalib et al. | 370/95.1 |
| 5,247,675 | 9/1993 | Farrel et al. | 395/650 |
| 5,278,828 | 1/1994 | Chao | 370/85.6 |
| 5,343,473 | 8/1994 | Cidon et al. | 370/85.6 |
| 5,444,703 | 8/1995 | Gagliardi et al. | 370/60.1 |
| 5,463,629 | 10/1995 | Ko | 370/110.1 |
| 5,483,530 | 1/1996 | Davis et al. | 370/79 |

*Primary Examiner*—Thomas C. Lee
*Assistant Examiner*—Anderson I. Chen
*Attorney, Agent, or Firm*—Townsend and Townsend and Crew LLP

[57] ABSTRACT

A system providing a multiple number of virtual channels in a computer system having a smaller number of physical channels. Multiple queues are provided that are mapped to channels. The mapping of the queues to the channels changes depending on the message traffic and priority of the queues. Queues of lower priority are preempted if a higher priority queue needs a channel.

6 Claims, 4 Drawing Sheets

SYSTEM FOR MULTIPLEXING PRIORITIZED VIRTUAL CHANNELS ONTO PHYSICAL CHANNELS WHERE HIGHER PRIORITY VIRTUAL WILL PRE-EMPT A LOWER PRIORITY VIRTUAL OR A LOWER PRIORITY WILL WAIT

BACKGROUND OF THE INVENTION

This invention relates generally to data transfer in computer systems and specifically to the software emulation of a number of virtual channels by using a smaller number of physical channels.

Data transfer within and between computer systems has always been critical to the overall performance of the computer systems. Typically, transfer of data is via one or more buses having a fixed number of parallel hard-wired lines. Other forms of transmission are possible such as over a fiber optic cable, by radio transmission, etc. The physical medium, whether hard-wired lines, fiber optic cable or radio transmission, are referred to as the "physical channel" of the data transfer system.

In order to effectively use the physical channel to transmit data within and between computer systems, additional hardware and software are used to provide high level software processes using the physical channel with a simplified set of operations to transfer data. The hardware systems and software processes that make up the various components in a data transfer system are referred to as "layers."

A popular example of a well-defined communications architecture is the standard defined by the International Standards Organization (ISO). The ISO model is called the Open Systems Interconnection (OSI) model. The OSI standard consists of seven layers which define conceptual divisions in a communications architecture. As an example, the physical channel described above is called a "physical layer" in the OSI model. While a specific data transfer system may not have all seven layers present, each system must have at least the physical layer or physical channel. An example of a very simple system would be a physical layer that communicates with a software layer. The software layer provides a degree of transparency in that an a higher level software program, such as an operating system routine or an application program, that wants to use the physical channel does so by communicating with the software layer. The software layer provides predefined advanced communication commands, such as "send buffer," for the higher level program's use so that the higher level program does not have to be concerned with the details of operating the physical channel.

Software control of the physical channel by the software layer provides various other conveniences to higher level programs or processes. For example, the software control typically provides one or more buffers for receiving data from a sending process and subsequently transmitting the buffered data over the physical channel. By buffering the data the software control allows the sending process to indicate a large amount of data to be transmitted and allows the sending process to then proceed with other tasks. The buffered data is automatically transmitted over the physical channel when the physical channel becomes available. Many other advantages in using software control of the physical channel can be realized such as by implementing packet switched transmission techniques to break a larger transmission into multiple smaller transmissions. Packet switching allows data to be multiplexed over a single physical channel so that, for example, multiple messages can be broken up and their packets interleaved so that the transmission of the multiple messages occurs "concurrently." Multiplexing provides advantages at both the sending and receiving ends in terms of maximizing the use of limited computing resources.

Other forms of multiplexing, such as standard channel multiplexing are known and are described in references such as *Computer Architecture: A Quantitative Approach*, Hennessy & Patterson. However, these traditional multiplexing approaches require expensive and complex I/O controllers or other hardware.

Another advantage of software control of physical channels is that different messages can be assigned different priority levels so that when the physical channel is being used to send a message of a low priority the software controller can preempt the low priority message transmission to more quickly begin a higher priority message transmission. By definition, the quick sending and receiving of high priority messages is of vital importance to computer systems. For example, notification of power being lost in a computer system is an example of a high priority message that is of immediate interest to all processors so that the processors can act to preserve data.

One way to implement a priority scheme is to use multiple physical channels. Different physical channels can be assigned different priority levels so that the control software gives a higher priority physical channel more resources than a lower priority physical channel. While the existence of multiple physical channels provides advantages to a computer system there are also drawbacks. For example, the cost of hardware is increased. Also, the number of priority levels is limited by the number of physical channels.

SUMMARY OF THE INVENTION

The present invention provides a multiple number of virtual channels at different priorities by using a smaller number of physical channels. One method of the invention implements the virtual channels in a computer system. The computer system includes a fixed number m, of physical channels for transferring data with other computer systems. One or more programs executing in the computer system send data over the physical channels. The method comprises the following steps executed by the processor: Accepting transmission requests from the programs to send data over n virtual channels, where n is greater than m; for each transmission request performing the following steps: Mapping a virtual channel to a physical channel; and sending the data over the mapped physical channel.

DESCRIPTION OF THE PREFERRED EMBODIMENT

Figure 1:
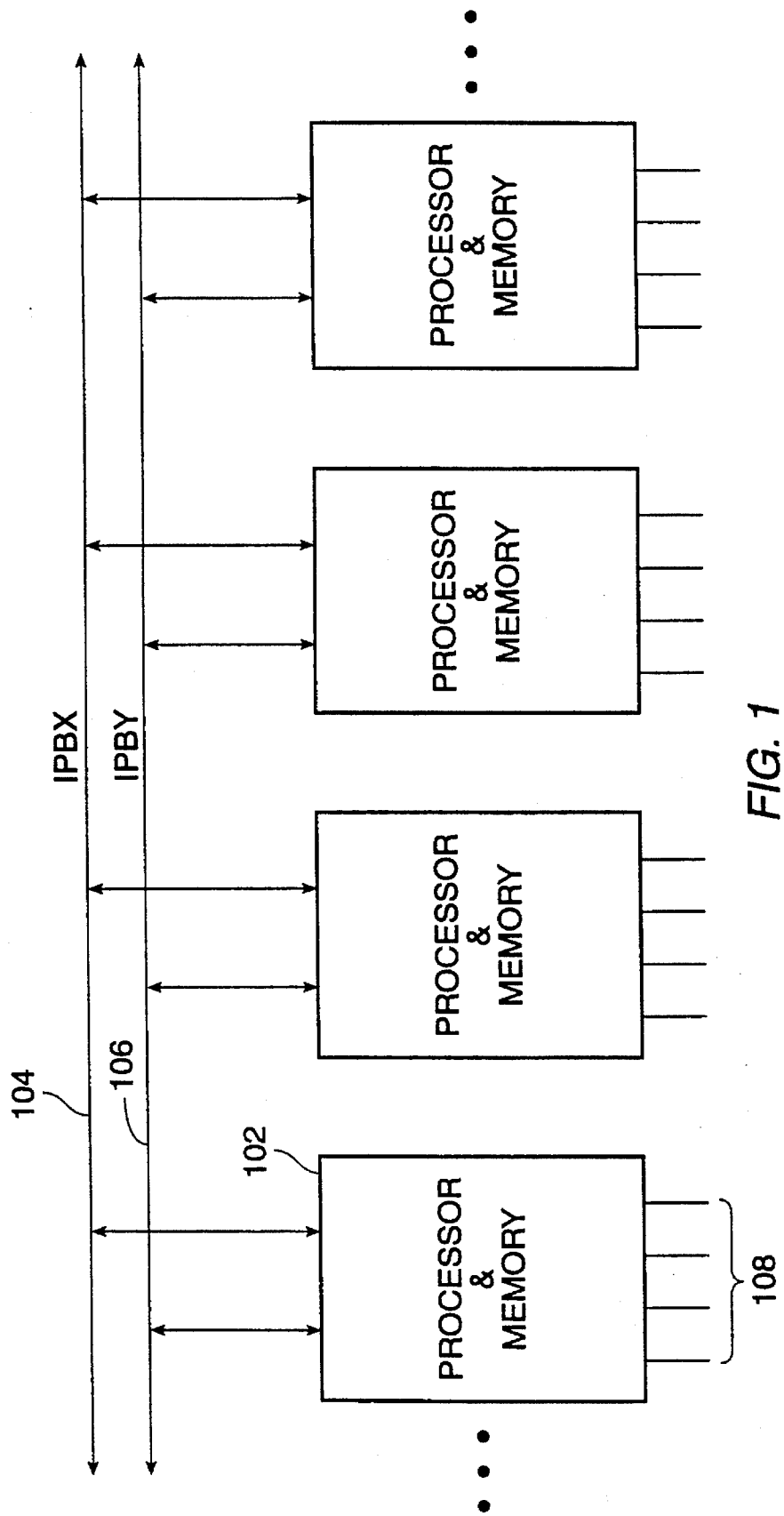
FIG. 1 is a block diagram illustrating basic processor interconnections.

FIG. 1 is a block diagram illustrating the basic processor interconnections relevant to a preferred embodiment of the invention. In FIG. 1, multiple processors such as processor 102 are connected via inter-processor buses (IPBs) such as 104 and 106. Processors such as 102 include not only processing capability also memory that is dedicated to each processor. That is, the memory is not shared between processors. The architecture of FIG. 1 and the embodiment of the invention discussed herein are implemented in a commercial computer system designated as the Tandem Non-Stop Himalaya K10000 server, manufactured by Tandem Computer Inc. Interprocessor buses as such 104 and 106, labeled IPBX and IPBY respectively, are used to provide efficient high-speed communication between the processors in accordance with the invention as discussed below. Other ancillary connections such as I/O channels at 108 and their associated hardware are not fully shown in FIG. 1 since they are not relevant to a discussion of the virtual communication channels which are implemented solely across the IPBX and IPBY channels.

In the preferred embodiment, there are two physical busses, the IPBX and the IPBY buses; each bus, in turn comprises two physical channels, channel 0 and channel 1. It will be readily apparent that any number of physical channels can be used and that the number of processors communicating on the buses may also be two or more.

Figure 2:
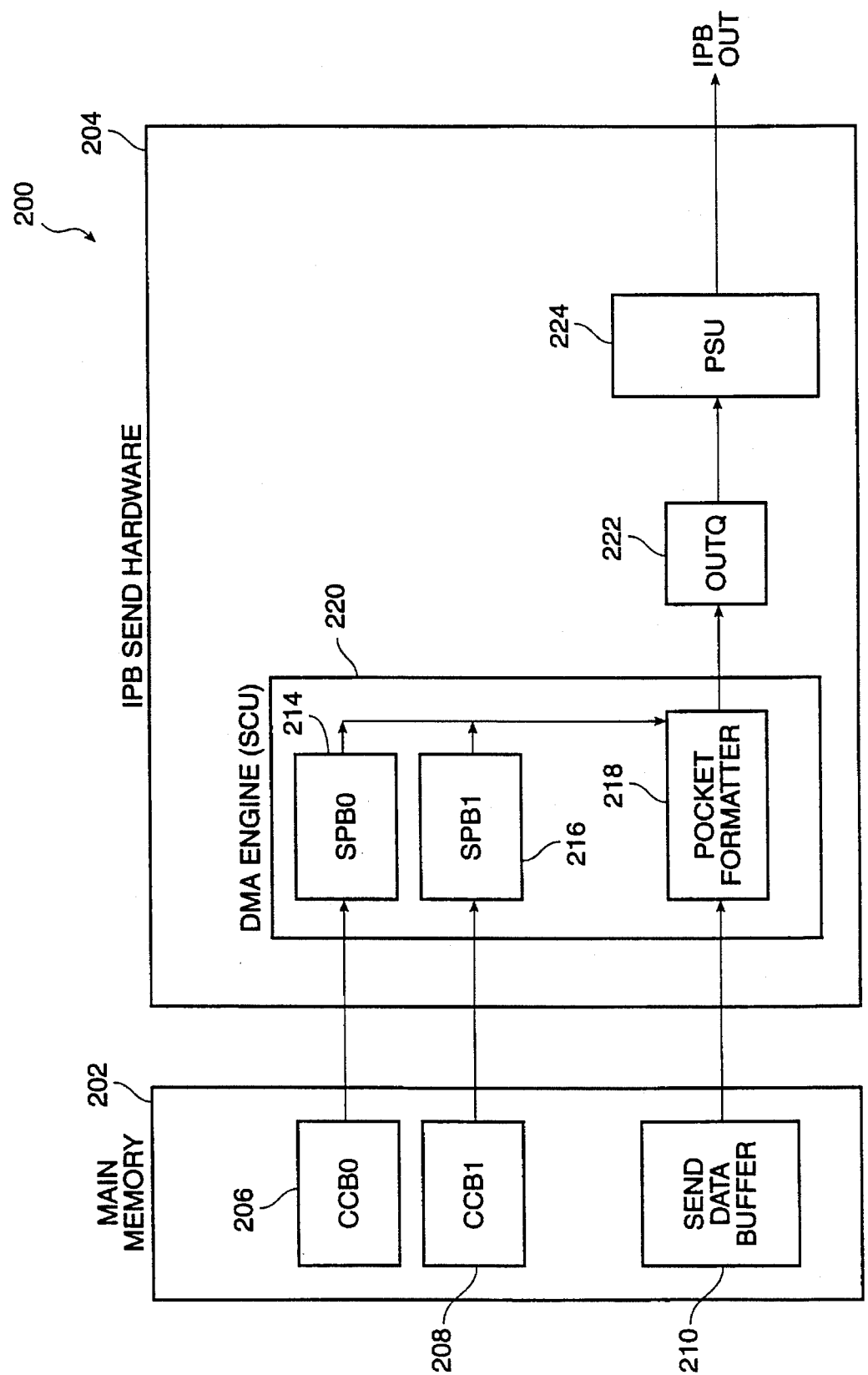
FIG. 2 is a block diagram of send hardware and data structures relevant to transmitting data using the present invention.

FIG. 2 is a block diagram of the send hardware and data structures relevant to transmitting data over the IPB buses. The structures shown in FIG. 2 are present in each of the processors, such as processor 102, shown in FIG. 1. Only the data structures and hardware related to sending data over the buses, as opposed to receiving data, is illustrated in FIG. 2. It will be readily apparent to one of ordinary skill in the art that many traditional systems suitable for receiving the data sent according to the present invention are possible. Further, in FIG. 2, structures and hardware are only shown for a single one of the IBPX or IBPY buses. The structures and hardware of FIG. 2 are duplicated for the second identical bus. Each bus has two physical channels. The invention implements four virtual channels on the two physical channels for each bus.

In FIG. 2, send system 200 includes memory 202 and send hardware 204. Boxes in memory 202 represent data structures while boxes in hardware 204 represent hardware subsystems. Each hardware subsystem may be implemented in numerous ways. In the preferred embodiment, Packet Formatter 218 and PSU 224 are state machines with registers. OUTQ 222 is simply hardware random access memory (RAM) and can be structured as a first-in-first-out (FIFO) queue.

The preferred embodiment uses three layers in its communications architecture. These are the physical layer, the millicode layer and the software layer. The physical layer is the physical channel and its associated hardware and firmware/software that performs basic input output (I/O) operations. The millicode layer is an intermediary layer between physical layer and the software layer. Millicode is software, itself, that provides increased flexibility to make changes to the physical layer without affecting the software layer and vice versa.

Finally, the software layer provides an interface to higher level programs so that the higher level programs may use powerful commands to facilitate data transfer without dealing with the details handled by the two lower layers.

Next, each of the three layers, beginning with the physical layer, are discussed in turn.

The physical layer is implemented by "send hardware" that incorporates several key features. The send hardware uses a command-chaining direct memory access (DMA) engine 220 controlled by the processor through mailboxes located in main memory. DMA engine 220 performs send-data fetching and packet formatting. A multichannel send structure is implemented; the send hardware has two independent DMA send channels per bus that multiplex on a packet basis into the send stream shown as "IPB out" in FIG. 2. A first DMA send channel includes the combination of circular command buffer 0 (CCB0) and send parameter block 0 (SPB0) connected to packet formatter 218. Similarly, CCB1 and SPB1 connect to packet formatter 218 to form the other DMA send channel. CCBs are 256 bytes and hold up to 16 commands, where each command is 16 bytes long. SPBs are 16 bytes and hold the current command being executed.

The send channels are completely interruptible and restartable at packet boundaries. DMA engine 220 switches between channels 0 and 1 as it formats packets for the bus. The processor can perform a sequence of one or more sends on a single channel by describing those sends in one of the CCBs 206 or 208. After the CCB is set up, the processor starts the DMA send hardware for that channel. For a more detailed description of the operation of the bus and channels see "NonStop Himalaya K10000 Server Description Manual, by Tandem Computers Incorporated, December 1993, Part No. 084559.

The DMA send hardware, called the send control unit (SCU), is a "DMA engine." It fetches a single command from the CCB into its local storage, SPB0 or SPB1, and then executes it. The single command can describe a send segment of up to 16 kilobytes of contiguous physical memory. The send command is executed by handling as many packets as needed. For each packet, the SCU fetches data from memory, formats it into an IPB packet, and places that packet into the OUTQ. Once the packet has been placed in the OUTQ without encountering any errors, the SCU updates its local working pointers so the next packet can be fetched. It then informs the other send hardware unit, the packet send unit (PSU), to send the packet already in the OUTQ.

The PSU operates in the IPB bus clock regime and follows the protocol set by the IPB bus controller (not shown). The PSU asks to send a packet when the bus controller permits it and sends the packet when the bus controller orders it to do so. After the packet is sent, the PSU informs the SCU whether it was sent successfully or given a NAK handshake by the receiver. (A NAK is a flow-control feature of the bus controller's protocol that causes the packet to be retransmitted.) The PSU does not retry NAKed packets on its own; the decision to retry is made by the SCU, allowing effective use of the traffic-shaping and multiple-channel features.

When all of the data in a single segment has been fetched, formatted into packets, and sent by the PSU, the SCU fetches the next command in the CCB mailbox. The new command is executed just as the first one was. This process continues until the end of the chain of commands is reached. At the end of the chain, if so requested by the last command, the SCU posts a send-completion notification interrupt to the processor. In addition, if the send should terminate abnormally, such as with an uncorrectable memory error (UCME) detected in the data buffer, the SCU posts an abnormal-completion interrupt to the processor.

The SCU and PSU form a two-stage pipeline so that they can operate concurrently, fetching and formatting one packet while the previous packet is being sent. This pipeline is completely emptied at intercommand boundaries within a command chain. Therefore, the full performance benefit of this pipelined organization is not realized unless send segments are at least three or four packets long. With shorter messages, a single channel typically cannot send at the maximum bus rate much of the time.

Once the CCB is set up and the DMA engine is started, the processor is not involved in send activities except for performing minor monitoring functions described later in the millicode layer section below. With the hardware structure as shown in FIG. 2, the processor can set and start a DMA transfer independently on each of the two send channels. Whenever both channels are actively processing through their command chains, the PSU can be kept busy at the maximum bus rate even if the two streams each consist of short segments. Thus, the dual send channels increase efficiency in addition to avoiding the time-critical blockages described above.

Next, the millicode layer of the communication architecture of the present invention is discussed.

The millicode layer resides between the physical layer and the software layer. In the Himalaya K10000 product the software layer is referred to as the "NonStop Kernel." The millicode layer provides a queue-driven interface in software to the send hardware and uses a send information block (SIB), created with information from the software layer, to communicate all the information about a send operation to the physical layer. The software layer constructs a SIB describing the send to be performed and calls a millicode routine, Enqueue_Send, to request the initiation of the send operation. Enqueue_Send initiates the send immediately, if possible, or places the SIB in one of several queues for later processing. In either case, Enqueue_Send returns control to the caller without waiting. Enqueue_Send is called by the NonStop Kernel, or message system layer. Enqueue_Send, in turn, calls Channel_Remap. Channel_Remap controls the remapping of virtual channels as discussed below.

The millicode provides an efficient routine, Send_Status, that the NonStop Kernel can use to check on the progress of a send operation. For cases in which the kernel must override the usual K10000 practice of not waiting for a send to complete, the millicode provides the Wait_on_Send routine to do so. To cancel an End-Progress send, the kernel can call the Cancel Send routine. In all of these cases the SIB is a parameter to the routine.

The K10000 IPB hardware can chain send commands (and send buffers) together for greater efficiency. A limited form of this feature is exposed to the NonStop Kernel by allowing information about multiple sends to be grouped together in a single SIB. This allows the message system to group together frequently related sends such as the "setup" packets, the user's "request control," and "request data" packets. Significant efficiency is gained by grouping these together in a single SIB. The millicode keeps these operations together as its links the SIB into queues, converts the SIB information into hardware commands, initiates and tracks the send operation's progress. In most cases, when the millicode uses the hardware send-chaining feature to initiate all the send areas described in an SIB with a single operation.

The millicode layer and software layer of the present invention work together to implement virtual send channels on the two physical channels of the physical layer. In a preferred embodiment, the software layer provides higher level programs with multiple send channels per physical channel. These multiple send channels, or virtual channels, allow the higher level programs to operate with increased flexibility and efficiency as described below. In a preferred embodiment, four virtual channels are implemented on two physical channels for each bus. The choice of four virtual channels allows the splitting of local and remote sends on separate physical channels in the preferred embodiment and also allows for a time-critical send channel separate from the normal channels. Because of design constraints the number of physical channels is limited to 2 channels per bus. By providing four virtual channels per bus to the higher level software, and dynamically mapping between the four channels as described below, higher level software is able to function as though four prioritized channels are available to it. The preferred embodiment has 2 buses for a total of 8 virtual channels, although they are configured as two systems of 4 virtual channels each. For ease of discussion the invention is described with respect to a single bus except where indicated.

The IPB millicode maintains a queue of four SIBs for two physical channels. At any given time two queues are matched to the two hardware send channels, while the other two queues are pending. That is, two emulated channels are not mapped. Whenever a send (SIB) is completed or a new send (SIB) is initiated, the millicode reevaluates the mapping to achieve the maximum sending concurrency while maintaining the priority order of the queues.

When a SIB is placed into an empty queue that is mapped to a send channel, or when an SIB reaches the head of a mapped queue because earlier SIBs have been completed, the millicode initiates sending the data described by the SIB by converting the information in the SIB into hardware commands placed in the channels CCB as discussed above in connection with FIG. 2.

Under the normal, relatively light IPB loads the send channels are idle when each send is started. In these cases, no interrupt is generated when a send is completed. Instead, the channel status is checked when each new send is initiated; only at that time does the millicode notice the completion status of the previous send operation. However, in heavy message traffic queues may temporarily form. In these cases, it is preferable to incur the expense of handling an interrupt to get the next send started at the earliest opportunity, rather than use some time-based status polling. The hardware optionally generates send completion interrupts, a facility the millicode uses only when its queues are not empty. Similarly, the millicode optionally generates send-completion interrupts, a facility the message system uses only when its queues are not empty.

The millicode periodically monitors the progress of a send operation according to a parameter supplied in the SIB. If the send not making progress within the time prescribed, it is canceled and a send-timeout interrupt is generated. The millicode then initiates the next queued send, if any.

Next, the software layer, also called the NonStop Kernel, is discussed.

The software layer provides messaging services to the rest of the kernel, to system programs and to application programs. For more information on messaging services consult The Guardian Message System and How to Design for It," Chandra M., 1985, Tandem Systems Review, Vol. 1, No. 1. Tandem Computers Incorporated. Part no. 83934. The software layer provides a request-reply message interface to processes running on the same processor or different processors in the system. It also provides the same message protocols to processors running on remote systems.

The message system is the highest layer of the three layers comprising the communications architecture. The software layer communicates with the IPB hardware through a routine supplied by the millicode.

The software layer uses the four virtual channels referred to as channels 0–3. Each channel is assigned a priority with channel 0 having highest priority followed by channel 1, 2 and 3. The software layer uses channel 0 exclusively for sending critical messages to other processors on the IPB buses. These messages include time-critical unsequenced IPB packets such as a packet containing a message that a given processor is still functioning properly, a packet indicating the processors are "regrouping" or attempting to reform an ordered and cooperative processing group and "poison packets" sent when a processor is slow to respond or has been declared down for purposes of deactivating the target processor.

Messages sent using predetermined system utilities are also transmitted on virtual channel 0. All sends on channel 0 require the sending processor to "buswait" until the transmission is completed by calling the Wait_on_Send millicode routine. The processor can service interrupts while busywaiting but it cannot run processes. The software layer uses channel 1 exclusively for sending unacknowledged messages to other processors over external networks. These include time-critical unsequenced handshake packets exchanged by designated processes when establishing or modifying connections, periodic idle packets exchanged to preserve these connections and packets sent to the network controller. These send operations also cause the processor to busywait until the transmission is completed.

Channels 2 and 3 are low priority channels used to send acknowledged messages and their acknowledgements. The software layer uses channel 2 to send messages to other processors in the same system and channel 3 to send to remote processors on the network. For example, referring to FIG. 1, the four processors shown can be considered to be in the same system. Additional processors physically removed from the four processors in the first system would be considered remote processors connected to the first system by a network as discussed above. Messages sent on channels 2 and 3 are queued in the millicode and do not cause busywaiting. The software layer supports a transmission window of four outstanding unacknowledged transmissions to each destination processor.

When a message is to be sent from one processor to another the software layer picks the X or Y bus and a channel based on whether it is a remote or local send. A check is made to see if the SIB for the selected bus and channel is free by calling the Send Status millicode routine. If the SIB is free the software layer copies the send information into it. The SIB contains multiple send areas to describe the multiple buffers that constitute a message going over the IPB.

The message system then calls the Enqueue_Send millicode routine to initiate the send operation. A single millicode operation is sufficient to send the multiple buffers forming a message. The millicode places the SIB in a queue for the channel. When the channel becomes free, the millicode commands the send channel to begin sending the data associated with the SIB at the head of the queue. If the send status routine indicates that the SIB is in use (either being transmitted or awaiting transmission), the message system requests the millicode to invoke a special interrupt when the transmissions associated with the SIB are completed. The message is then placed at the tail of a queue of messages waiting for the SIB to become free. When the SIB-completed software interrupt is invoked, the interrupt handler removes the message at the head of the queue of messages waiting for the SIB and arranges to have the message sent.

Next, steps in a method for implementing virtual channels is discussed with reference to the flowchart of FIG. 3. The flowchart of FIG. 3 implements routine "Channel_Remap".

Figure 4:
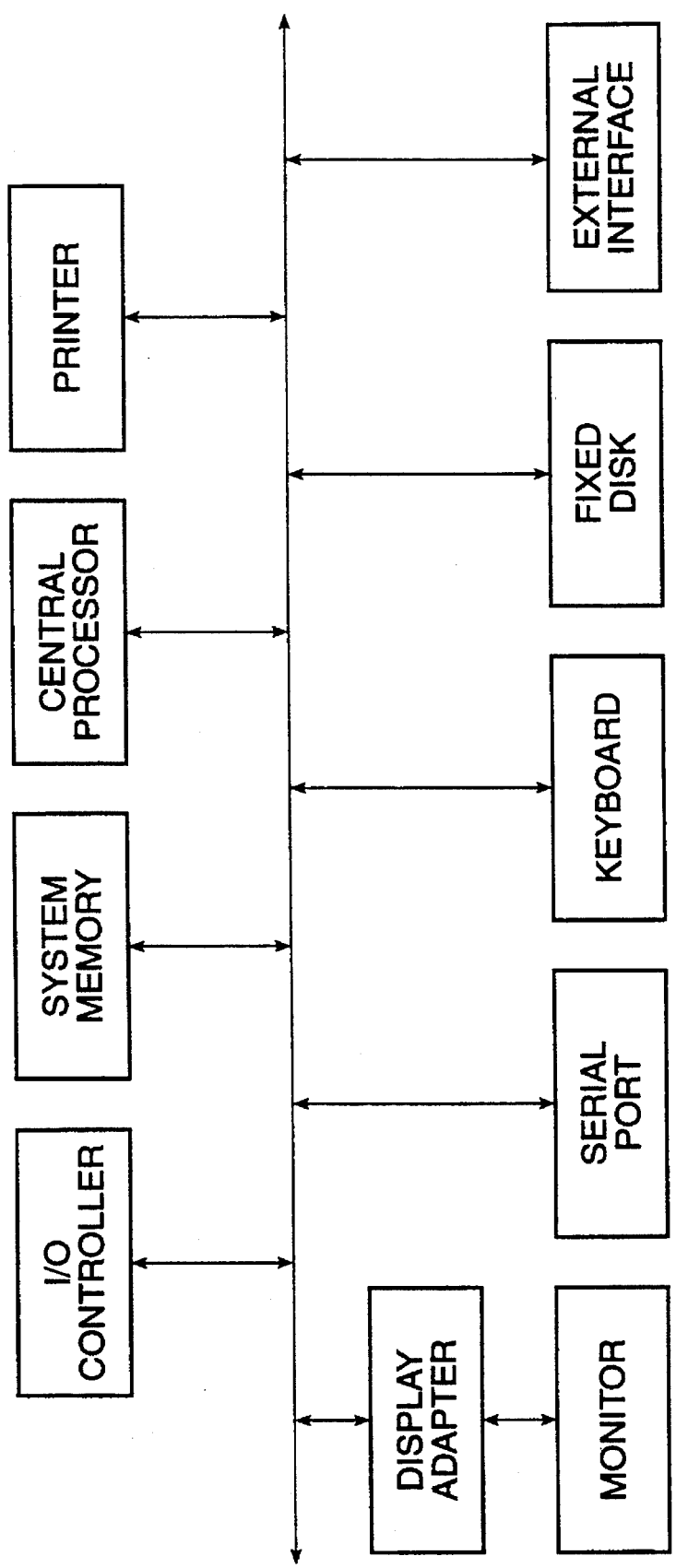
FIG. 4 is a block diagram of subsystems in a general purpose computer.

In general, the flowcharts in this specification illustrate one or more software routines executing in a digital system such as processor 102 of FIG. 1. However, the routines may be implemented by any means as is known in the art, such as in a general purpose computer having the system components shown in FIG. 4. Any number of computer programming languages, such as "C", Pascal FORTRAN assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart is referred to as if it is implemented as a single "routine".

Figure 3:
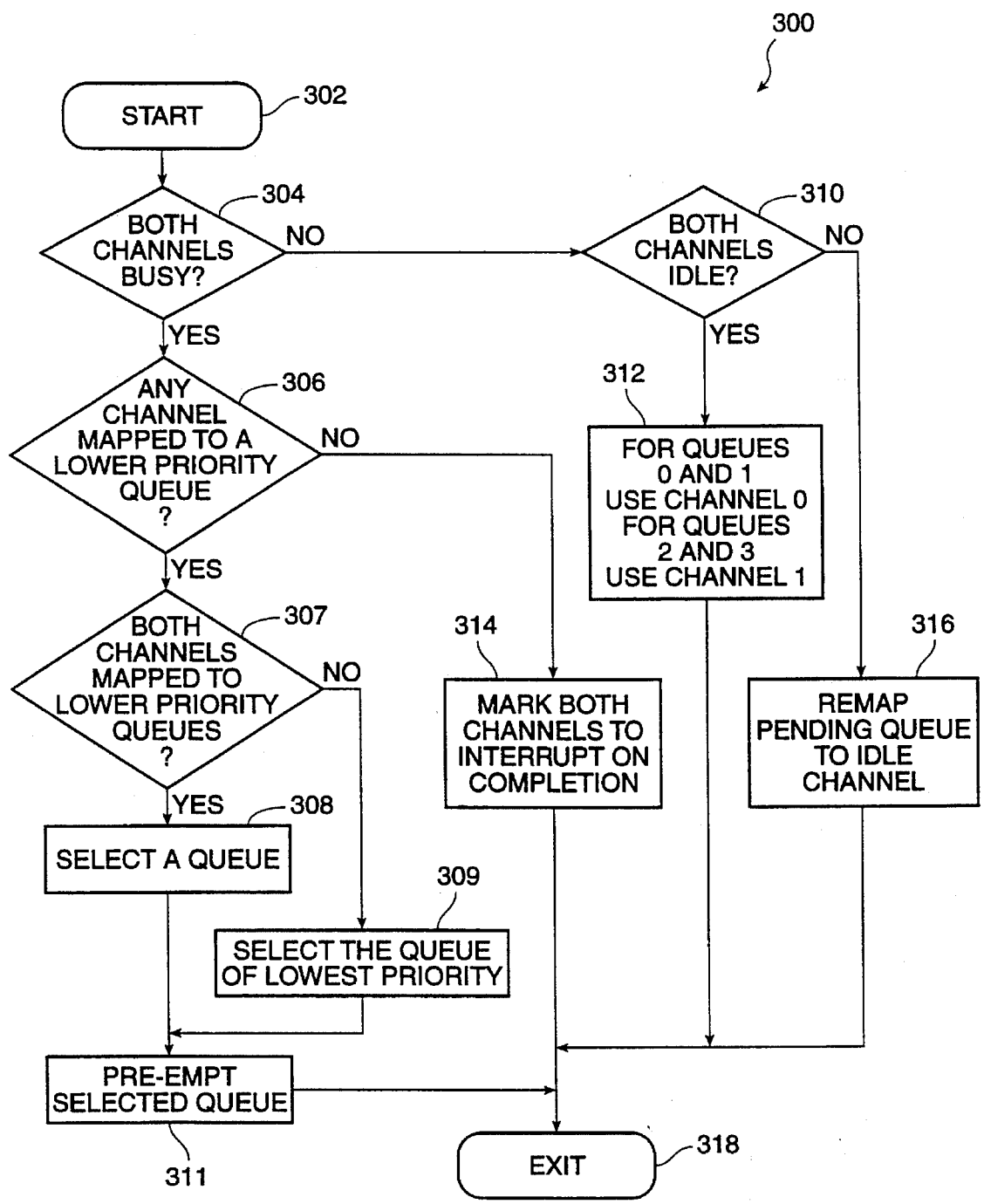
FIG. 3 shows flowchart for a routine that remaps multiple prioritized virtual channels.

FIG. 3 shows flowchart 300 having basic steps in a routine that implements multiple prioritized virtual channels by using a smaller number of physical channels in a preferred embodiment. As discussed above, the preferred embodiment uses two interprocessor buses, IPBX and IPBY, thus providing two independent buses. In each bus, four queues are used for two CCBs such as CCB0 and CCB1 of FIG. 2. The queues are operated as discussed above.

With respect to a single bus, during operation of a computer system using the present invention each of the four queues may be mapped or unmapped. A default mapping is for queue 0 to be mapped onto channel 0, queue 2 to be mapped onto channel 1 and queues 1 and 3 to be unmapped. Whenever a send command is initiated into an unmapped queue remapping is attempted by calling the routine of flowchart 300. The usage of the four queues is shown below in Table I:

TABLE I

| Queue | Messages |
|---|---|
| 0 | local, high-priority, infrequent, short. |
| 1 | remote, high-priority, infrequent, short. |
| 2 | local, low-priority, frequent, variable-size (sequenced traffic). |
| 3 | remote, low-priority, frequent, variable-size (sequenced traffic). |

Routine 300 is entered at step 302 when a queue that is unmapped is asked to send information. This unmapped, pending queue is one of the queues 0, 1, 2 or 3. The priority scheme is that queue 0 has highest priority followed by queues 1, 2 and 3 so that queue 3 is of lowest priority. At step 304 a check is made as to whether both physical channels are currently mapped to a queue and transmitting. If so, execution proceeds to step 306 where a check is made as to whether one or more channels are mapped to a queue of lower priority than the pending queue. If not, both channels are marked to interrupt on completion. The millicode "arms" an interrupt so that the pending queue can be immediately mapped to the first channel that becomes available.

If, instead, at least one channel is mapped to a queue of lower priority execution proceeds to step 307. For example, assuming the pending queue to be queue 1, if queue 0 is currently mapped to channel 0 and queue 2 is currently mapped to channel 1 then execution proceeds to step 307 where a check is made as to whether both mapped queues are at lower priority than the pending queue. Since, in this example, only one mapped queue, queue 0, is of higher priority than pending queue 1 step 309 is executed to select mapped queue 2 for preemption. Step 311 performs the preemption and the routine exits at step 318.

If, on the other hand, the pending queue is queue 0 and the mapped queues are queues 1 and 2 the check at step 306 causes step 308 to be executed, instead. This selects one of the two mapped queues, 1 or 2, both of lower priority than pending queue 0, for preemption. In the preferred embodiment, a channel that is performing a local send is preempted in favor of another mapped queue. However, many different guidelines for selecting a channel to preempt are possible. Once a channel is selected for preemption at step 308, step 311 is executed to preempt the selected queue and the routine of flowchart 300 is exited at step 318.

Preemption is performed in the code in large part by routine "Eviction_Notice". When a lower priority queue is preempted in favor of a higher priority pending queue the transmission over the channel that the queue to be preempted is mapped to is allowed to complete the current "page" being transmitted. In the preferred embodiment, a page is 4096 bytes. If the channel is transferring the last page in a transmission then there is no preemption. If the channel is transferring any other page then the queue is preempted between pages.

In other embodiments a mapped queue could be allowed to finish its transmission if it is making progress and near completion. Progress could be determined by intermittently checking the size of the data to send. If subsequent checks show the size of the data to send diminishing at a fast enough rate then the mapped queue would be allowed to finish transmission. Other criteria, such as only allowing the queue to complete its send if the queue is making progress and is "near completion," that is the number of bytes to send is below a predetermined threshold.

Returning to step 304, if one or both channels are idle (i.e., not transmitting. Note that a channel can be mapped or unmapped and still be idle) execution proceeds to step 310 to determine how many of the channels are idle. If both channels are idle then execution proceeds to step 312 where a mapping is made according to predetermined rules. The rules followed at step 312 are that queues 0 and 1 are mapped to channel 0 while queues 2 and 3 are mapped to channel 1. These rules are implemented in the code beginning at "remap_grabit".

If there is only a single channel idle at step 310 then execution proceeds to step 316 where the single channel is mapped to the pending queue and any queue that was mapped to the single channel is unmapped. In general, when a queue is mapped to a channel, any other queue that was currently mapped to the channel is unmapped from the channel.

Thus, the discussion above shows that the routine of flowchart 300 achieves a remapping of queues by executing one of the remapping steps 308, 310, 314 or 316 depending upon the present mapping of channels and queue priorities. In this way, four queues, or virtual channels, are provided to high level software. The implementation of these four queues is via only two physical channels.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for implementing virtual channels in a computer system, wherein the computer system includes a fixed number, m, of physical channels for transferring data with other computer systems, wherein the computer system further includes one or more programs executing in the computer system that send data over the physical channels, the method comprising the following steps executed by the processor, of:

accepting transmission requests from the programs to send data over n virtual channels, where n is greater than m;

for each transmission request, mapping dynamically said n virtual channels onto said m physical channels, wherein said step of mapping dynamically includes the sub-steps of:

determining whether a specified one of said n virtual channels is currently mapped to one of said m physical channels;

mapping said specified one of said n virtual channels to one of said m physical channels when said specified one of said n virtual channels is not currently so mapped; and sending data over one of said m physical channels via said specified one of said n virtual channels mapped thereto;

assigning a priority ordering to each of said n virtual channels;

wherein a physical channel is busy when it is mapped to a virtual channel and said physical channel is being used to send a transmission, said transmission comprising data; and wherein, when all m physical channels are busy, said step of mapping said specified one of said n virtual channels further includes the sub-steps of:

comparing a priority of said specified one of said n virtual channels with a priority of each currently mapped virtual channel;

if said specified one of said n virtual channels has a lower priority than each currently mapped virtual channel, then waiting until one of said m physical channels is no longer busy before mapping said specified virtual channel to one of said m physical channels instead; and if said specified channel has a higher priority than one or more of said currently mapped virtual channels, then preempting use of a physical channel by a lower-priority currently mapped virtual channel by interrupting a transmission on said physical channel and mapping said specified virtual channel to said physical channel instead.

2. The method of claim 1, wherein transmitting data over a physical channel includes a process of packet switching;

wherein each transmission includes data arranged in a plurality of data packets; and wherein said step of preempting use of said physical channel by said lower-priority currently mapped virtual channel includes a sub-step of waiting until a current data packet is transmitted over said lower-priority mapped virtual channel before preempting a transmission over said lower-priority channel.

3. The method of claim 1, wherein said step of preempting use of said physical channel by said lower-priority currently mapped virtual channel includes the substeps of:

determining whether a transmission over said lower-priority currently mapped virtual channel is near completion;

determining whether said transmission is making progress; and if said transmission is near completion and making progress, then waiting until said transmission is complete before preempting use of said physical channel by said lower-priority currently mapped virtual channel.

4. The method of claim 3, further comprising the steps of:

if said transmission is not near completion, then interrupting said transmission; and if said transmission is not making progress, then interrupting said transmission.

5. The method of claim 3, wherein said step of determining whether said transmission over said lower-priority currently mapped virtual channel is making progress includes a sub-step of checking the amount of data in said transmission remaining to be sent, wherein said sub-step of checking is performed once every 10 milliseconds.

6. The method of claim 3, wherein said step of determining whether said transmission over said lower-priority currently mapped virtual channel is near completion includes a sub-step of determining whether the amount of data in said transmission remaining to be sent is less than a predetermined threshold.

* * * * *